US005415683A

United States Patent [19]

Leavitt

[11] Patent Number: 5,415,683
[45] Date of Patent: May 16, 1995

[54] VACUUM PRESSURE SWING ADSORPTION PROCESS

[75] Inventor: Frederick W. Leavitt, Amherst, N.Y.

[73] Assignee: Praxair Technology, Inc., Danbury, Conn.

[21] Appl. No.: 153,507

[22] Filed: Nov. 17, 1993

[51] Int. Cl.$^6$ .............................. B01D 53/047
[52] U.S. Cl. ........................... 95/101; 95/130
[58] Field of Search ............... 95/98, 100–105, 95/130; 96/114

[56] References Cited

U.S. PATENT DOCUMENTS

| | | | |
|---|---|---|---|
| 2,944,627 | 7/1960 | Skarstrum | 95/26 |
| 3,164,454 | 1/1965 | Wilson | 95/130 |
| 3,182,435 | 5/1965 | Axt | 96/114 |
| 3,280,536 | 10/1966 | Berlin | 95/105 X |
| 3,313,091 | 4/1967 | Berlin | 95/105 |
| 3,430,418 | 3/1969 | Wagner | 95/100 |
| 3,738,087 | 6/1973 | McCombs | 95/98 |
| 3,922,149 | 11/1975 | Ruder et al. | 95/130 X |
| 3,923,477 | 12/1975 | Armond et al. | 95/130 X |
| 4,065,272 | 12/1977 | Armond | 95/130 X |
| 4,194,891 | 3/1980 | Earls et al. | 95/98 |
| 4,222,750 | 9/1980 | Gauthier et al. | 95/102 |
| 4,359,328 | 11/1982 | Wilson | 95/98 |
| 4,519,813 | 5/1985 | Hagiwara et al. | 95/101 |
| 4,534,346 | 8/1985 | Schlaechter | 95/102 X |
| 4,539,020 | 9/1985 | Sakuraya et al. | 95/101 |
| 4,561,865 | 12/1985 | McCombs et al. | 95/130 X |
| 4,599,094 | 7/1986 | Werner et al. | 95/101 |
| 4,684,377 | 8/1987 | Haruna et al. | 95/130 X |
| 4,685,939 | 8/1987 | Kratz et al. | 95/130 X |
| 4,705,541 | 11/1987 | Sircar | 95/98 |
| 4,810,265 | 3/1989 | Lagree et al. | 95/101 |
| 4,892,565 | 1/1990 | Schmidt et al. | 95/101 |
| 4,892,566 | 1/1990 | Bansal et al. | 95/98 |
| 5,042,994 | 8/1991 | Smolarek | 95/101 X |
| 5,248,322 | 9/1993 | Kumar | 95/101 |

OTHER PUBLICATIONS

Suh and Wankat, "Combined Cocurrent-Countercurrent Blowdown Cycle in Pressure Swing Adsorption", AI Ch.E Journal, Mar. 1989, vol. 35, No. 3, pp. 523–526.

Liow and Kenny, The Backfill Cycle of the Pressure Swing Adsorption Process, AICHE Journal, vol. 36, No. 1, pp. 53–65, Jan. 1990.

*Primary Examiner*—Robert Spitzer
*Attorney, Agent, or Firm*—Alvin H. Fritschler

[57] ABSTRACT

A trans-atmospheric pressure swing adsorption process is carried out using product gas for purge and partial repressurization in the production of oxygen from air. No transfer of gas is made directly from one bed to another, as for pressure equalization purposes, but the power requirements are reduced under controlled pressure swing conditions.

19 Claims, 1 Drawing Sheet

VACUUM PRESSURE SWING ADSORPTION PROCESS

BACKGROUND OF THE INVENTION

1. Field of the Invention

The invention relates to a pressure swing adsorption process for the production of oxygen from air. More particularly, it relates to improvements to enhance adsorbent utilization and reduce the energy requirements of the process.

2. Description of the Prior Art

In numerous chemical processing, refinery, metal production and other industrial applications, purified gas streams are employed for a variety of processing purposes. For example, high purity oxygen is used in chemical processing, steel mills, paper mills, and in lead and gas production operations. Oxygen and nitrogen are produced from air, typically by cryogenic distillation. While such cryogenic processing can be very efficient, particularly when conducted in large size plants, it nevertheless requires complex and costly equipment.

Pressure swing adsorption (PSA) processes have also been used to separate and purify gases, but the production of oxygen by the PSA approach has generally been confined to relatively small-sized operations with respect to which the use of cryogenic air separation may not be economically feasible. Many commonly available adsorbents, particularly the class of materials known as molecular sieves, selectively adsorb nitrogen more strongly than oxygen, and this preferential adsorption is the basis of a variety of PSA processes that have been developed for the separation of air to produce oxygen and nitrogen product gas.

PSA processes for air separation to produce product oxygen are known in the art, as indicated by the Skarstrom patent, U.S. Pat. No. 2,944,627. Such processes typically comprise four separate operating steps carried out, in turn, in each bed of multi-bed PSA systems. Such steps are (1) adsorption, in which feed air is passed at an upper adsorption pressure to the feed end of the bed, containing adsorbent material capable of selectively adsorbing nitrogen as the more readily adsorbable component of air, with the less readily adsorbable oxygen being recovered from the product end of the bed; (2) countercurrent depressurization to a lower desorption pressure; (3) desorption of the more readily adsorbable nitrogen from the adsorbent bed, and its withdrawal from the feed end of the bed with or without the introduction of purge gas to the product end of the bed; and (4) repressurization of the bed to the upper adsorption pressure. This processing sequence, or variations thereof, is then repeated in each bed of the system with additional quantities of feed air, as continuous oxygen-producing operations are carried out in the PSA system.

When the PSA process is employed principally to remove strongly adsorbable impurities present in low concentration in a gas stream, i.e., $CO_2$ and/or $H_2O$ in air, the constant pressure steps of adsorption (1) and desorption (3) occupy most of the processing cycle time, and the pressure change steps, i.e., countercurrent depressurization (2) and repressurization (4) are transients. In the production of oxygen from air, where the more readily adsorbable nitrogen comprises 79% of the feed stream, the pressure change steps are of greater significance to the overall processing efficiency. Many different modifications of the basic PSA processing sequence have been developed, including many variations in the pressure swing steps.

Most PSA processes for producing oxygen from air are carried out in multi-bed system, i.e., systems incorporating two or more adsorbent beds, with each bed undergoing the same sequence of steps, but in a different phase relationship with the other beds in the system. The processing steps are synchronized and are usually carried out for fixed periods of time. Operating in this manner, the supply of oxygen product can be made more steady, and the utilization of mechanical pumps made more nearly constant than otherwise would be the case. Many PSA processes also employ one or more pressure equalization steps, wherein gas withdrawn from one bed at high pressure is passed to another bed initially at low pressure until the pressures in said beds are equalized. This procedure has the advantages of saving some compression energy, supplying the equivalent of purge gas if the equalization is accomplished through the product ends of the beds, and elevating the overall recovery of desired oxygen product.

A particular PSA process for producing oxygen from air utilizes a three bed system and incorporates the following processing steps: (1) adsorption with feed air introduction, bed pressurization and simultaneous oxygen product recovery; (2) co-current-depressurization for further product recovery; (3) pressure equalization; (4) countercurrent depressurization; (5) purge and (6) repressurization. This process operates with a typical upper adsorption pressure of 50 psia, and a lower desorption pressure of one atmosphere. While this processing system and process can effectively recover oxygen from air, it is not sufficiently efficient for use in large volume commercial operations. The operating costs for such systems are high because of the relatively high compression ratio required. For a given product flow rate, the adsorbent inventory required for such systems is also relatively high.

PSA processes have also been developed that operate between atmospheric adsorption pressure and a relatively deep vacuum desorption pressure. Since the adsorptive storage of nitrogen is pressure dependent, such processes require a large adsorbent inventory, which greatly increases the capital costs associated therewith.

In another three bed PSA process, a six step processing sequence is employed that operates between super-atmospheric and vacuum pressure levels. This processing sequence in each bed includes (1) bed repressurization from 4 to 13 psia with both feed air and a portion of the product gas; (2) adsorption with feed air introduction and product withdrawal, while the bed pressure is increased from 13 to 22 psia; (3) bed equalization, with a pressure reduction from 22 to 13.5 psia; (4) bed purge, with a slight further pressure reduction from 13.5 to 12.5 psia; (5) evacuation from 12.5 to 7 psia, and (6) bed purge, with a pressure reduction from 7 to 4 psia. Using step times of about 30 seconds for each step, this approach endeavors to minimize power consumption, but said power consumption is nevertheless still too high for large scale oxygen production.

It has also been found that this process can be improved by employing a partial pressure-equalization step instead of the essentially full pressure equalization conventional in the PSA art in which the adsorbent selectively adsorbs nitrogen from air. Various other modifications of the basic PSA process have been proposed in the art, with most being related to variations in the pressurization and depressurization steps. Suh and Hankat, in AICHE J 1989 35 523, have, for example, reported on the merits of using combined co-current-countercurrent depressurization steps in PSA processing. For producing oxygen from air, they report finding that the addition of a simultaneous co-current depressurization step is not helpful. Their two bed cycle utilizes a backfill repressurization step, wherein the product end of the high pressure bed is connected to the product end of the low pressure bed, with passage of gas from one bed to another being continued until the lower pressure bed attains the high pressure.

Liow and Kenny, AICHE J (1990) 36 53, have also studied a backfill step for oxygen production. Applying a mathematical model that includes rate effects as well as the equalization properties of the adsorbent, i.e, 5A zeolite, to the behavior of a super-atmospheric PSA cycle incorporating such a backfill step, with the flow rates being controlled. They found that this PSA processing cycle was beneficial for producing an enriched oxygen product- The maximum oxygen purity reported, however, was less than 80%, which is much less than the oxygen concentration required for a high purity oxygen product.

It is apparent that a great many modifications and variations of the basic PSA cycle, or processing sequence, have been investigated, with many such modifications or variations having been employed in commercial PSA operations, as for the production of oxygen from air. A wide variety of possible individual steps for carrying out the pressurization and depressurization steps have been investigated. In spite of such extensive efforts, conducted over a long period of time, PSA processes for the production of high purity oxygen remain inefficient and uneconomical, especially for large plant applications. Thus, there remains a need in the PSA art for still more efficient PSA processing that can be scaled up for the large volume production of high purity oxygen from air.

It is an object of the invention, therefore, to provide an improved, highly efficient PSA process for producing oxygen from air.

It is another object of the invention to provide an improved PSA process for producing oxygen from air with lower power requirements than presently pertain.

It is a further object of the invention to provide an improved PSA process having lower power consumption and with capital costs similar to, or lower than, those pertaining to conventional commercial PSA processes for the production of large volumes of high purity oxygen from air.

With these and other objects of the invention in mind, the invention is hereinafter described in detail, the novel features thereof being particularly pointed out in the appended claims.

SUMMARY OF THE INVENTION

A trans-atmospheric PSA processing sequence of six essential steps is employed, with no pressure equalization step included. The power requirements of the process are desirably reduced despite and because of the absence of pressure equalization in multi-bed PSA systems.

BRIEF DESCRIPTION OF THE DRAWINGS

The invention is hereinafter described in detail with reference to the accompanying drawings in which.

DETAILED DESCRIPTION OF THE INVENTION

Figure 1:
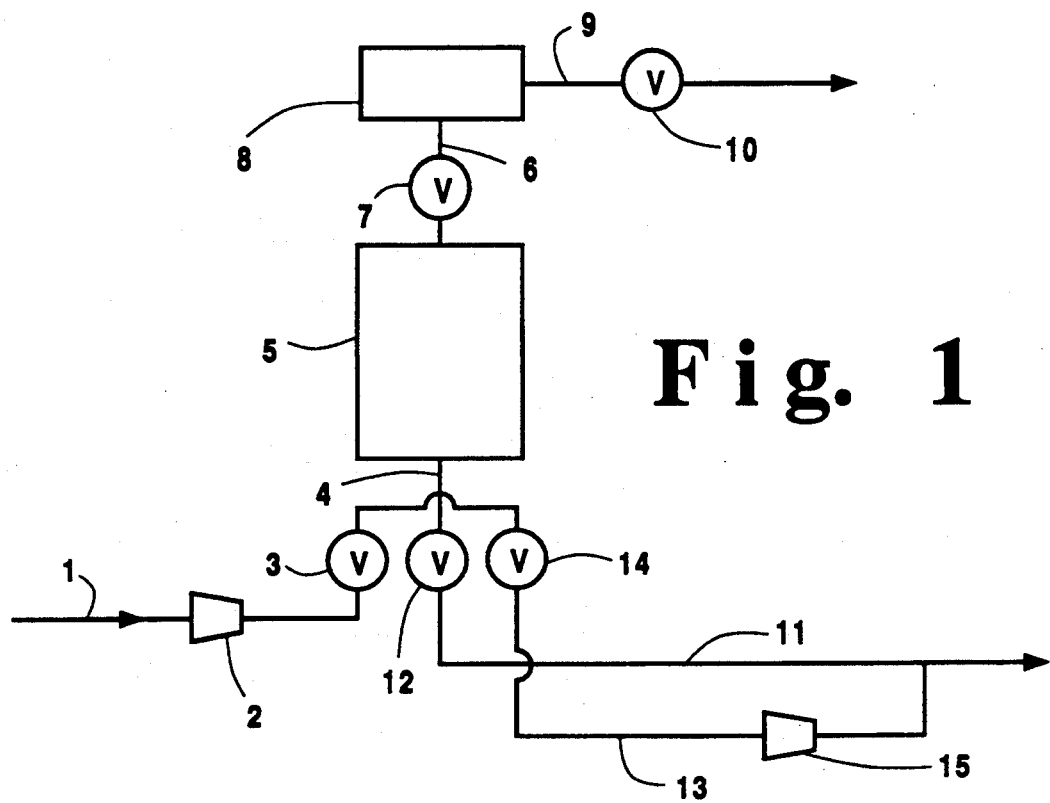
FIG. 1 is a schematic flow drawing of a single bed embodiment of the PSA system employed in the practice of the invention.

The objects of the invention are accomplished by employing a trans-atmospheric PSA processing sequence that employs a novel sequence of operating steps carried out on a cyclic basis in one or more beds as follows: (1) air feed pressurization of an adsorbent bed from an intermediate pressure level to a minimum super-atmospheric adsorption pressure, with the selective adsorption of some nitrogen from the feed air; (2) air feed at the super-atmospheric pressure, with nitrogen adsorption and simultaneous oxygen product withdrawal from the product level of the bed; (3) countercurrent depressurization to an intermediate pressure, with release of gas from the feed end of the bed; (4) evacuation to a low sub-atmospheric, i.e. vacuum, desorption pressure level; (5) product gas purge from the product end of the bed at the desorption pressure; and (6) product gas repressurization of the bed to the intermediate pressure level. As indicated above, no pressure equalization or other steps are employed that involve the direct transfer of gas from one bed to another. The processing sequence of the invention can be used in a single bed vacuum pressure swing adsorption (VPSA) system, although multi-bed systems are preferred for large volume oxygen production. Because the processing step sequence requires no inter-bed gas transfer, synchronization of the bed steps is not essential but phase synchronization of the overall cycle is desirable for efficient sizing and utilization of the compressor(s) and vacuum pump(s) employed in the VPSA system.

In many prior art PSA oxygen processes, a co-current depressurization step with release of gas from the product end of the bed, for pressure equalization purposes, is employed. It is known that this step leads to increased recovery of oxygen and it is commonly assumed that the increased recovery results in energy savings, particularly as the pressure generated in one bed is partially used to increase the pressure in another bed. It has been found, however, that the pressure equalization step, unexpectedly and surprisingly, leads to an increase in the power needed for compression, as well as increased bed size factor (BSF), even while it increases the recovery of oxygen. It has been determined that the elimination of the pressure equalization step can actually result in savings in power consumption, as well as savings in bed size, when operating pressures are employed in a desired range. While oxygen recovery is reduced in the practice of the invention, this does not detract from the overall improvement in efficiency obtained in the practice of the invention. By proper selection of the pressure levels, and the control of individual processing steps, a high purity oxygen product can be conveniently and economically obtained in the practice of the invention.

The purge step of the invention is stopped just before breakthrough of high concentrations of oxygen into the waste stream. Although it will be understood that there will always be some oxygen passing to waste during the product purge step, breakthrough occurs when there is a significant increase in the oxygen concentration in the gas withdrawn from the feed end of the bed during the product purge step. It is advantageous to keep the bed pressure approximately constant during the product purge step. The amount of purge gas that can be effectively used is approximately proportional to the pressure employed, and decreases with increasing operating temperature.

During the next step of the sequence, enough product pressurization gas is admitted to the bed to complete the necessary purging of the more selective nitrogen and other impurities away from the product end of the bed. This purging action is necessary to allow the PSA cycle to produce high purity oxygen (with argon) by sharply reducing the amount of nitrogen contamination of the desired oxygen product. It has been found preferable to terminate the product repressurization step when there has been sufficient purging action of nitrogen and other impurities away from the product end of the bed, as additional product pressurization will result in reduced cycle efficiency.

From the above, it will be appreciated that significant features of the invention include (1) using as much product purge as possible without creating significant oxygen breakthrough, and (2) then, using only as much product pressurization as is needed to ensure adequate purging of nitrogen and other impurities away from the product end of the bed to achieve required product purity.

It should be noted that the particular operating conditions employed in the practice of the invention will vary depending on the particular requirements of a given PSA oxygen embodiment, and on the particular adsorbent employed. Generally preferred conditions for lithium X zeolitic adsorbent are:

1. Upper adsorption pressure of from about 110 kPa to about 160 kPa; and
2. Lower desorption pressure of from about 30 kPa to about 50 kPa.

Generally preferred conditions for sodium X zeolitic adsorbent are:

1. Upper adsorption pressure of from about 120 kPa to about 160 kPa; and
2. Lower desorption pressure of from about 40 kPa to about 70 kPa.

Generally preferred conditions for calcium X zeolitic adsorbent are:

1. Upper adsorption pressure of from about 100 kPa to about 120 kPa; and
2. Lower desorption pressure of from about 20 kPa to about 35 kPa.

If the PSA cycle is to produce oxygen product in the needed range of 90% to about 95.6% oxygen purity, there must be sufficient low-pressure gas backflow, or reflux, in the adsorbent bed. Near the product end of the bed, the needed reflux largely comprises the product purge gas used in Step 5 of the process, and the partial product repressurization gas used in Step 6. The low-pressure reflux flows act to push trace amounts of nitrogen away from the product end of the bed, just as the high-pressure gross product flow in the bed acts to carry nitrogen toward and through the product end of the bed. The low-pressure reflux flow can carry nitrogen more easily than does the high-pressure gross product. As a result, the reflux flow can be less than the gross product flow. Nevertheless, a certain minimum amount of reflux gas is needed, and more than the minimum can be added to enhance the process of keeping most of the nitrogen away from the product end of the bed.

The ratio of total reflux to the amount of gross product, or to the amount of net product, depends on the effective ratio of pressures involved, and on the selectivity and performance of the adsorbent employed. A high ratio of adsorption pressure to desorption pressure, and an effective adsorbent, can combine to cut the ratio of needed reflux to gross product or net product.

Part of the reflux, as noted above, is provided by the purge gas used in Step 5. For desorption pressures within the preferred range for a particular adsorbent, it is usually desirable to use the maximum amount of purge gas, without creating the massive breakthrough of oxygen into the waste stream referred to above. Such a breakthrough would waste energy, since it leads to useless compression of oxygen-rich gas in both the feed compressor and in the waste compressor.

The maximum amount of purge gas is usually insufficient to provide all of the needed reflux unless oversized adsorbent beds are employed. The remaining portion of the reflux gas must be supplied by the partial product repressurization gas. Thus, product repressurization should be continued long enough to supply the necessary amount of total reflux gas so as to control the nitrogen flow in the adsorbent bed. Use of excess quantities of product repressurization gas, however, would be wasteful. At the end of the product repressurization step, the adsorption pressure should preferably be no greater than about 70% of the upper or maximum adsorption pressure level.

As an illustrative example of the conditions providing good VPSA oxygen performance, using lithium X zeolite, 8×12 beads as the adsorbent material, the following conditions pertain with respect to a particular embodiment of the invention:

| Bed depth | 1.60 meter |
| --- | --- |
| Cycle time | 60 seconds |
| Step times | |
| Step 1 | 7 seconds, air feed pressurization |
| Step 2 | 23 seconds, air feed and product recovery |
| Steps 3&4 | 10 seconds, countercurrent depressurization - evacuation |
| Step 5 | 10 seconds, product purge |
| Step 6 | 10 seconds, product repressurization |
| Pressure | |
| Upper adsorption pressure | 120 kPa |
| Intermediate pressure | 90 kPa |
| Lower desorption pressure | 50 kPa |
| Feed rate | |
| Gross product rate | 687 mol/cycle/sq.m |
| Purge | 198 mol/cycle/sq.m |
| Product pressurization rate | 90 mol/cycle/sq.m |
| Net product rate | 53 mol/cycle.sq.m |
| Product purity | 90.4% |

With respect to the operation of a single adsorbent bed embodiment of the invention, FIG. 1 illustrates such a VPSA system having feed inlet line 1, containing compressor 2 and valve 3, which connects to line 4 passing into the bottom portion of adsorbent bed 5. At the top of bed 5, line 6 containing valve 7 passes to surge tank 8. Product oxygen can be recovered from surge tank 8 through line 9 containing valve 10.

Line 4 from the bottom of bed 5 also connects with line 11 containing valve 12 for the discharge of a waste stream from adsorbent bed 5. Line 4 likewise connects with line 13 containing valve 14 and vacuum pump 15 that, in the illustrated embodiment, connects to discharge line 11.

Thus, the single bed VPSA system of the invention consists of a single adsorbent bed, a feed compressor or blower, a vacuum pump, and a product surge tank or storage vessel, all connected through appropriate lines and valves. Chart 1 below is an operation chart illustrating the operation of the illustrated single bed embodiment of the invention.

CHART 1

| SINGLE ADSORBENT BED PROCESSING CYCLE | | | | | | |
|---|---|---|---|---|---|---|
| Bed Steps | FP | AO | CD | EV | PG | PP |
| Pressure step control | Pi-Ph | Ph | Ph-Po | Po-Pl | Pl | Pl-Pi |
| Compressor | on | on | off | off | off | off |
| Vacuum pump | off | off | off | on | on | off |

In Chart 1, FP represents the feed pressurization step; AO, the air feed at super-atmospheric pressure; CD, the countercurrent depressurization step; EV, the evacuation of the bed to sub-atmospheric pressure level;, PG, purge with product gas; and PP, product pressurization. Pi represents intermediate pressure level; Ph, the upper adsorption pressure level;, Po, the pressure level reached in the countercurrent depressurization step; and Pl, the lower vacuum desorption level.

Considering the single bed embodiment to start when the adsorbent bed has attained a predetermined pressure level Pi, following partial product pressurization, Step 1 involves the opening of valve 3 connecting feed compressor 2 to adsorbent bed 5, with valves 7, 12 and 14 closed. The purpose of the step is to bring the pressure of adsorbent bed 5 up to the upper adsorption pressure level, while some of the nitrogen in the gas stream is preferentially adsorbed on the adsorbent, typically a molecular sieve zeolitic material, capable of selectively adsorbing nitrogen from feed air. When a predetermined upper adsorption pressure is attained, the step is completed. The termination of said Step 1 could be made after a calculated time interval. However, it is preferable to use the sensed pressure in the adsorbent bed vessel to control the end of the first step, and the start of the second step.

Step 2 begins when the pressure in vessel 5 reaches said upper adsorption pressure. Valve 7 is opened, and product oxygen flows from adsorbent bed 5 to product storage vessel 8. Feed air continues to enter the adsorbent bed, wherein nitrogen is selectively adsorbed. Ideally, this step should continue until there is incipient breakthrough of nitrogen at the product end of the bed, as determined by a conventional analytical probe or sensor in the region. This is a preferred mode of terminating this step, provided that the analysis is sufficiently rapid, but it may be necessary to terminate this step after a predetermined time, or after a calculated quantity of gas has passed through the adsorbent bed. During the second step in which product oxygen is being produced, the pressure may either be held constant at the upper adsorption pressure level or may be allowed to increase somewhat above this level. The pressure should not be allowed to fall significantly during this step, since such a pressure decrease would have the same ill effect on power and bed size that an equalization step would have.

Step 3 of the processing sequence may be conducted in either of two ways. In one approach, i.e. Step 3A, valves 3 and 7 are closed, and valve 12 is opened to blowdown, or countercurrently depressurize, adsorbent bed 5 by the countercurrent flow of gas from the feed end of the bed for discharge to the atmosphere. This step is desirably continued until the bed is near atmospheric pressure, but may extend for longer times without detriment. Valve 12 is then closed, and valve 14 is opened, so that vacuum pump 15 can further reduce the pressure to a predetermined lower sub-atmospheric desorption pressure level in Step 4 of the cycle. This step is preferably terminated by sensing the bed pressure. In an alternative approach, i.e. Step 3B, valve 12 is omitted, and all of the depressurization gas flow passes through vacuum pump 15, thus combining Steps 3 and 4. The choice of approach used for Step 3 depends on the design of the equipment used. If the vacuum pump can function as an expander, and thus generate energy during the initial blowdown portion of the Step, then Step 3B is preferable. If, however, the blowdown flow adds to the burden of the vacuum pump, then Step 3A is preferred.

After such bed depressurization to low sub-atmospheric desorption pressure, Step 5 is begun with valve 6 opened so that a countercurrent flow of product gas from the product end of the bed to the feed end thereof purges the adsorbed nitrogen from the bed. This step is stopped before any appreciable discharge of oxygen in the waste stream occurs. Ideally, this should be determined by conventional analysis of the gas at the feed end of the bed. In some circumstances, however, this step may be terminated after a predetermined period of time or after the flow of a computed quantity of gas from the feed end of the bed.

For Step 6, valve 14 is then closed, and the bed is partially pressurized, through valve 6, until the intermediate pressure level is attained.

When the process of the invention is used to recover a high purity oxygen product, i.e. 90% to 95% or more, the low pressure backflow or reflux must be adequate to remove the nitrogen contamination from the product end of the bed. As indicated above, this is accomplished in the purge and product repressurization steps, i.e. Steps 5 and 6. As much product purge as possible is desirably used without causing significant breakthrough of oxygen into the waste stream.

While the individual processing steps may occur for fixed periods of time, it is preferable to control the steps by sensing physical variables, such as pressure and composition, or a combination of time and physical measurements. Such control techniques can adjust the process for changes in the environment, such as changes in ambient pressure and temperature. The control techniques may also be combined with other means to compensate for variations in oxygen product demand.

With a single adsorbent bed, there is no need to define a particular cycle time. Each step desirably continues until the controlling variable attains its predetermined value. Subsequent steps then occur in a similar manner until all of the steps in the processing sequence have been carried out and the sequence is complete for each processing cycle of the invention. With multiple bed systems, it is possible to run each bed independently, and the process is then simply a collection of single bed units. By the elimination of steps requiring bed-to-bed gas transfer, such as pressure equalization steps, there is no essential requirement for synchronizing the operation of the beds. For proper sizing and efficient operation of the compressor(s) and vacuum pump(s), it is often desirable that the overall cycle of each bed be synchronized with the cycles as carried out in other beds in the system. It should be noted, however, that this does not mean that each individual step must be so synchronized. As long as there are some steps of variable duration, such as Step 3 above, these can be used for idling purposes to adjust the cycle of a given bed with the cycles of the other beds for efficient machine utilization purposes.

Figure 2:
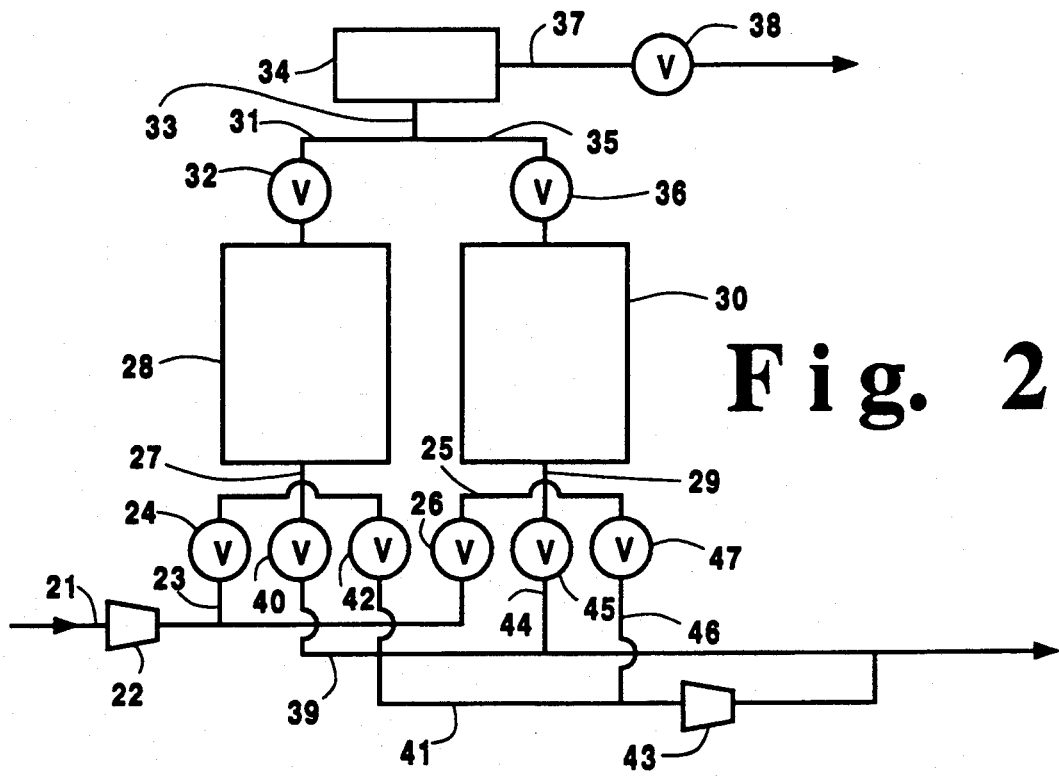
FIG. 2 is a schematic flow diagram of a two bed embodiment of the PSA system employed in the practice of the invention.

A two bed PSA system of the invention is shown in FIG. 2 of the drawings. In this embodiment, feed line 21 containing compressor 22 branches into line 23 containing valve 24, and line 25 containing valve 26. Line 23 connects with line 27 passing to the feed end of adsorbent bed 28, while line 25 connects with line 29 passing to adsorbent bed 30. Line 31 containing valve 32 passes from the product end of bed 28 to line 33 in communication with product surge tank 34. Likewise, line 35 containing valve 36 passes from bed 30 to said line 33 to establish fluid communication with product surge tank 34. Oxygen product can be recovered from surge tank 34 through line 37 containing valve 38.

At the feed end of bed 28, line 27 connects with line 39 containing valve 40 for the discharge of waste gas from the system. Line 27 also connects with line containing valve 42 and vacuum pump 43, said line 41, in the illustrated embodiment, being connected to line 39 downstream of vacuum pump 43. Similarly, line at the feed end of bed 30 connects with line 44 containing valve 45 for the passage of gas from said bed 30 to line 39 for discharge. Line 29 also connects with line 46 containing valve 47 for the passage of gas to line 41 upstream of vacuum pump 43. The operation of the FIG. 2 embodiment is shown in Chart 2 below, using the same designations as in Chart 1 described above.

CHART 2

TWO ADSORBENT BED PROCESSING CYCLE

| Bed 28 Steps | AO | CD | EV | PG | PP | FP |
|---|---|---|---|---|---|---|
| Bed 30 Steps | EV | PG | PP | FP | AO | BD |
| Compressor | on | off | on | off | on | |
| Vacuum pump | on | off | on | off | | |

In the operation of the two adsorbent bed system, the processing sequence is typically synchronized so that each step in one bed typically occurs while one or more specific steps occur in the other bed. Synchronization may also occur by allowing each step in each bed to run to completion and then starting the next step when shared equipment, such as the feed compressor and vacuum pump, or other shared equipment, is available. In order to maintain process variable control, it should be noted that some steps can be made arbitrarily long. Countercurrent depressurization (CD) is such a step. After a minimum length of time, when the pressure approaches the ambient, this step may be continued without detriment. In the illustration of Chart 2, the CD step in each bed is terminated when the other bed reaches its upper adsorption pressure level and is ready to begin its adsorption step at that pressure. It should be noted that the feed compressor operates nearly all the time, while the duty cycle for the vacuum pump is lower.

With the two bed cycle, it is possible that a step-change may call for the feed compressor or the vacuum pump to serve both beds at the same time. This may or may not be possible or desirable depending on the particular system employed. If multiple equipment use is not feasible, then the step-change calling for the machine already in use must be delayed by the imposition of an idle interval. During this idle interval, a bed may be isolated and/or the flow of gas interrupted. Idle periods are not shown in Chart 2, but they can be accommodated by assuming that the step-control variable, such as the intermediate or upper adsorption pressure level, is one such that the critical value is attained and the machine for the next step is available for other use or else the variable step goes into an idling interval until the machine is available. The feed blower or compressor and the waste blower or vacuum pump are shared resources, and either bed may use a shared resource at the same time or such simultaneous use may be interdicted or refused. For example, the two beds will usually be at different pressures at any given time. If the two beds are to use the waste blower at the same time, then the flow from at least one bed must be wastefully throttled, since the typical blower employed will have only one suction port and that port will be at one pressure. When it is considered imperative that two beds be able to use the one waste blower at the same time, the simultaneous use will be allowed, and the resulting throttling loss will be accepted. Otherwise, simultaneous use of the waste blower will be interdicted.

Charts 3-1 and 3-2 below illustrate the practice of the invention in two embodiments using a three bed VPSA system. The legends are as described above with respect to Chart 1.

CHART 3-1
THREE ADSORBENT BED PROCESSING CYCLE

| BED A STEPS | AO | BD | EV | PG | PP | FP |
|---|---|---|---|---|---|---|
| BED B STEPS | PP | FP | AO | BD | EV | PG |
| BED C STEPS | EV | PG | PP | FP | AO | BD |

| COMPRESSOR | ON | | ON | | ON | |
|---|---|---|---|---|---|---|

| VAC PUMP | | ON | | ON | | ON |
|---|---|---|---|---|---|---|

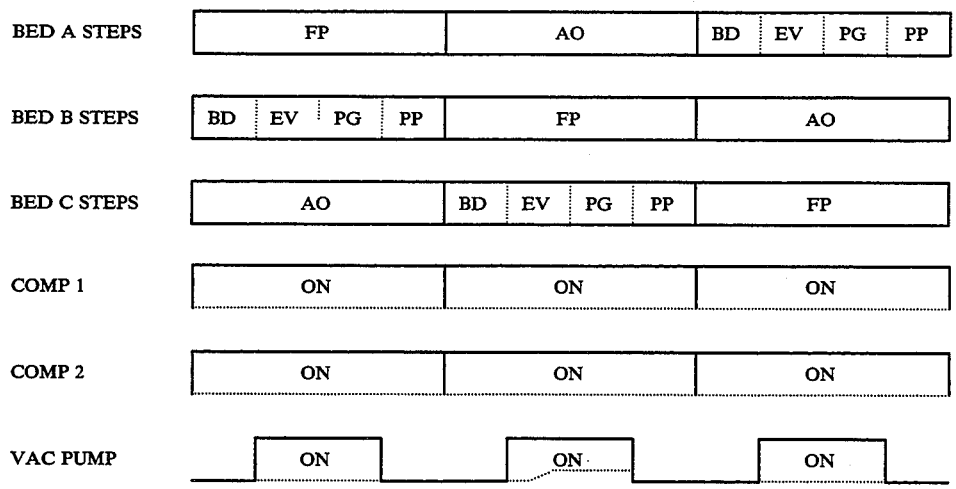

CHART 3-2
ALTERNATIVE THREE ADSORBENT BED PRESSURE CYCLE

In the three bed embodiment of this invention illustrated in Chart 3-1, one-third of the cycle time is allocated to upflow or adsorption steps, and two-thirds of the time is allocated to downflow or desorption steps. This distribution of time is advantageous for the desorption phase of the process in that the downward flow rates are low, and the pressure drops are correspondingly low. Conversely, the upward flow rates of the adsorption are very high, because the total upflow exceeds the total downflow by the amount of the product oxygen, and the time allocated for upflow is only half that for downflow. The upward flow rate is ultimately limited by lifting of the adsorbent in the bed, which is to be avoided.

In the cycle of Chart 3-2, two-thirds of the cycle time is upflow and one-third is downflow. The advantages and disadvantages cited above with respect to the Chart 3-1 are reversed in the case of the Chart 3-2 embodiment.

In the cycle embodiment of Chart 3-2, feed pressurization and fixed pressure adsorption occur simultaneously in different beds. It is desirable in this case to have two separate feed compressors for these functions, since each compressor can be optimized for the required service. The compressor(s) are in operation nearly all of the time, while the vacuum pump is in operation about half of the time for this processing cycle alternative. If the blowdown is conducted through the vacuum pump, the duty cycle for the vacuum pump would be increased. In the embodiment as illustrated in Chart 3-2, the beds are synchronized at each ⅓ of the overall cycle time. In order to accomplish this effect, the third cycle time must be long enough to accommodate the longest of the process steps, as determined by sensors. Process steps that are shorter must terminate and advance the dwell or idle intervals, which are not shown on the Chart. Such idle intervals somewhat reduce the duty cycles of the compressor(s) and vacuum pump.

It will be understood that the VPSA process of the invention can also be practiced in systems having four or more adsorbent beds. Such four bed cycle is similar to the Chart 3-2 three bed cycle, except that the total times for upflow and downflow are generally equal in the four bed cycle. This cycle is synchronized at the quarter cycle time by the same means as described above. Two separate feed compressors are employed, and each work on a duty cycle of nearly 100%. A single vacuum pump is used for both evacuation and purge steps, and this pump also operates over nearly 100% of the overall cycle time. If the blowdown energy is to be recovered, additional machinery would be required. It may also be desirable to employ different specifically designed pumps optimized for each process step.

It will be noted that, for load leveling purposes, a desirable processing step sequencing arrangement can be employed to achieve a continuous loading of the feed compressor or the vacuum pump. Thus, with respect to the two bed PSA system referred to above and illustrated generally in Chart 2 above, a desirable processing sequence, for purposes of maintaining a continuous load on a single waste blower, i.e., vacuum pump, would be to terminate the CD step in one bed at the same time the PG step is terminated in the other bed.

For maintaining a continuous load on the single bed blower, i.e., feed compressor, in such a 2-bed system, the AO step in one bed would be terminated at the same time the PP step is terminated in the other bed, or at the same time the FP step reaches one atmosphere pressure in the other bed.

In the 3-bed embodiments of the invention as referred to above, for purposes of maintaining a continuous load on a single waste blower, the CD step would be terminated in one bed at the same time the PG step is terminated in another bed, with steps EV and PG adding up to about ⅓ of the total cycle time of the processing sequence in each bed. In such embodiments, one or two feed blowers may be used.

For purposes of maintaining a continuous load on a single feed blower in said 3-bed embodiments of the invention, the AO step would be terminated in one bed at the same time the PP step is terminated, or the FP step reaches one atmosphere pressure, in another bed. Steps AO plus FP, or said step AO plus the superatmospheric pressure portion of FP, in such embodiments, would be of such duration that the combined time thereof would add up to about ⅔ of the total cycle time of the processing sequence in each bed. One or two waste blowers may be used in such embodiments.

In embodiments of the invention employing four or more beds in which it is desired to maintain continuous loads on several waste blowers operating at several average suction pressure levels, the CD step in one bed would be terminated at the same time the PG step is terminated in another bed, with steps EV and PG adding up to n/m of the total cycle time of the processing sequence in each bed, where "n" is the number of waste blowers employed, and "m" is the number of beds in the PSA system.

For continuous loads on several feed blowers operating at several average delivery pressures in such systems of four or more beds, the A0 step would be terminated in one bed at the same time the PP step is terminated in another bed, or at the same time the FP step reaches one atmosphere pressure in another bed.

It will be appreciated that, as more beds are added to the system, the ability to switch steps at critical process variables becomes more limited, and idling intervals are more likely to be required. By the use of presently available sensors and actuators with computer control methods, it is feasible and practical to operate complicated multi-bed systems. Most of the step switching decisions can be made according to the physical state of the components of the process. Queuing procedures well known in the computer art can be used to ascertain the availability of a compressor or vacuum pump and to switch beds accordingly, or interpose dwell or idling intervals that may be needed for synchronization purposes. With such computerized control methods, the individual bed cycles will tend to self-synchronize, but not according to a predetermined fixed time cycle.

The invention is further illustrated by the following illustrative examples. The values of the controllable process variables depend on the specified purity of the oxygen product and on the properties of the particular nitrogen-selective adsorbent employed. The range of preferred pressures for particular adsorbents were indicated above.

EXAMPLE 1

For the production of oxygen at a purity of 90.4% from feed air, using a lithium X adsorbent, in a two bed embodiment incorporating the process parameters recited above in the illustrative example of conditions providing good VPSA oxygen performance, the process steps are employed in accordance with Chart 4 as follows:

CHART 4
ALTERNATIVE TWO ADSORBENT
BED PROCESSING CYCLE

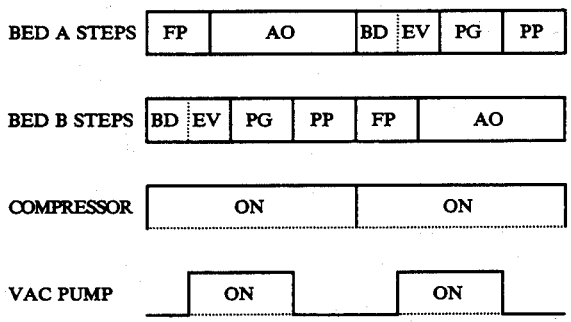

The two beds are synchronized when one bed has completed its adsorption step, and the second bed has been pressurized with product to intermediate pressure.

While the design flow rates would be made to balance the times for upflow and downflow, means would still be required to synchronize the two beds. The adsorption step cannot be extended to the point where nitrogen breaks through from the product end of the bed, so this step must be terminated before this occurs. A shorter step could be tolerated, but would be inefficient. The termination of the product pressurization step at an intermediate pressure is less critical, but should still be close to the design unit or the process efficiency will suffer. The simplest manner of meeting these criteria is to sense the composition in both beds. When either variable reaches its critical value, that bed would switch to an idling interval until the other variable attains its critical value. Then, both beds would be switched to the next step in their respective processing sequence. The duly cycles of the compressor and/or vacuum pump would be slightly reduced by the introduction of such idling intervals.

EXAMPLE 2

In an illustrative comparison of the process of the invention and a conventional process using pressure equalizations, lithium X zeolite in the form of 8×12 beads, was used in beds 1.6 meters deep. A cycle time of 70 seconds was used, and the mean bed temperature was 290°K. All cycles used full backpurge. The cycles were evaluated for a product purity of 90 mol % oxygen, as set forth in Table I below:

TABLE I

| CASE | 1 | 2 | 3 | 4 |
|---|---|---|---|---|
| Cycle Type | EQ | PP | EQ | PP |
| PP: Product Pressurization | | | | |
| EQ: Equalization | | | | |
| Adsorption Pressure, kPa | 144.8 | 144.8 | 140 | 140 |
| Desorption Pressure, kPa | 34.5 | 34.5 | 50 | 50 |
| Pressure at end of equalization falling step, kPa | 114.0 | 144.8 | 107 | 140 |
| Pressure at end of equalization rising step, or partial pressurization step, kPa | 62.0 | 62.0 | 90 | 90 |
| Oxygen Recovery | 57% | 53% | 49% | 46% |
| Power, kW/TPD Oxygen | 11.8 | 11.6 | 11.0 | 10.8 |
| Bed Size Factor, #/TPD Oxygen | 920 | 828 | 1322 | 1179 |

Power was calculated on the following basis:
Feed compression: adiabatic single—stage from 1 arm with 73% efficiency;
Waste compression: adiabatic single—stage to 1 atm. with 55% efficiency;
Product Compression: adiabatic two-state from adsorption pressure to 652.9 kPa with 77% efficiency;
Case 1 represents a state-of-the art process that employs a partial equalization step wherein the high pressure bed, after adsorption, undergoes a co-current blowdown into a low pressure bed, for partial pressure equalization purposes, by connecting the product ends of the two beds. There is no product repressurization step in Cases 1 and 3. Conversely, there is no co-current current depressurization and pressure equalization between beds in Cases 2 and 4, which represent embodiments of the invention. In Cases 2 and 4, the variable parameters were chosen to be similar to those of Cases 1 and 3, respectively. The main difference in the two processes, i.e., said EQ and PP, is that the pressurization of the low pressure bed by pressure equalization with another bed in Cases 1 and 3 is replaced by product repressurization in Cases 2 and 4.

Table I shows that oxygen recovery is reduced in Case 2, as compared to Case 1, and that the Bed Size Factor (BSF) (lbs. of adsorbent/TPD oxygen product) is also reduced. Both of these effects are to be expected. The power required in Case 2 is unexpectedly found to be slightly lower than that for Case 1.

In Case 4, the desorption pressure and the intermediate pressure were both increased, as compared to Case 2. Table I shows that this further reduces the power required for the process. The BSF is increased, and oxygen recovery is further reduced. Overall, however, the efficiency of the process is increased, due to reduction in power consumption, making the process of the invention advantageous as compared to prior art processes for many commercial applications where power consumption is a major consideration.

The relatively low oxygen recovery for the subject process is not detrimental because air for the feedstock is freely available. If recovery is low, more air must be compressed, but this is evaluated in determining power consumption. As long as the power requirements do not increase, a decrease in oxygen recovery is irrelevant.

The co-current blowdown of the prior art process serves to increase oxygen recovery, since the gas-phase oxygen concentration in the adsorbent bed falls during this step. This cuts the initial and average oxygen concentrations in the waste gas leaving the adsorbent bed during the subsequent evacuation step. With less oxygen in the waste stream, recovery is increased. This cuts the amount of waste gas produced and the amount of feed air needed. It is ordinarily assumed that this would result in lower power costs, since less feed air and waste gas must be compressed. Much of the effort put into optimization of this prior art cycle is directed to increasing oxygen product recovery.

A side effect of co-current blowdown is that the nitrogen storage, i.e., mol nitrogen per cubic meter of adsorbent bed, decreases during blowdown, resulting in a flow of desorbed nitrogen toward the product end of the bed. The nitrogen must be kept from leaving the bed to contaminate the product end of the other bed participating in the pressure equalization operation. To contain the nitrogen, the bed must be made large enough to hold the nitrogen at the final conditions of reduced pressure and reduced nitrogen storage. This results in an increase in Bed Size Factor for any given cycle time.

It is commonly believed that an increase in Bed Size Factor would be more than compensated for by a cut in power consumption related to an increase in oxygen recovery, as in the prior art processing. This has been found, surprisingly, not to be the case under the range of operating conditions desirable for the production of oxygen by conventional PSA processing. Thus, co-current blowdown decreases the starting pressure for the evacuation step, decreases the mean effective pressure of the waste stream leaving the bed during the evacuation step, decreases the mean effective pressure of the total waste leaving the bed during the two waste removal steps, and, therefore, decreases the mean effective pressure of the waste gas entering the suction end of the waste blower. The reduced mean effective pressure of the waste gas more than offsets the reduced number of mols of waste gas and so increases the total amount of work required to compress the waste gas to ambient pressure for discharge. This more than offsets the added work needed to compress the increased feed gas due to reduced product recovery in the practice of the subject invention.

The actual cutting of power in the practice of the invention, along with the decrease in oxygen product recovery and in BSF, surprisingly occurs provided that the nitrogen-selective adsorption process is carried out at relatively low adsorption pressures, i.e, those in the preferred ranges indicated above. Outside said ranges, particularly for higher adsorption pressures, elimination of the co-current blowdown step would still act to cut BSF, but would not cut power, and would actually increase the power requirements of the process. This would correspond to the general expectation in the art. Thus, the elimination of the co-current blowdown step has the surprising effect of cutting power consumption only when the generally preferred range of adsorption and desorption pressures are employed. As indicated above, the super-atmospheric adsorption pressure is generally in the range of about 100–160 kPa, and the lower sub-atmospheric desorption pressure is generally in the range of about 20–70 kPa with the particular pressures dependent of the adsorbent material employed in any given application.

The results of Table I show that switching from the equalization cycle to the partial product pressurization cycle of the invention results in a cut in power and BSF despite a decrease in oxygen recovery. This advantageous result occurred at both levels of adsorption and desorption pressures, i.e, 144.8 to 34.5 kPa in Cases 1 and 2, and 140 to 50 kPa in Cases 3 and 4.

As indicated above, product recovery is nearly irrelevant for oxygen production from air, since the raw material is freely available, a circumstance almost unique to oxygen production by air separation. Thus, the surprising effect of eliminating the co-current blowdown, and reducing power consumption, uniquely applies to oxygen production from air by VPSA processing using the preferred range of pressure conditions. This represents a significant advance in the PSA field, particularly in circumstances in which power consumption is a significant factor in the overall feasibility of employing the highly desirable PSA approach to the separation of air for the production of oxygen.

I claim:

1. An improved pressure swing adsorption process for the production of oxygen from air in an adsorption system containing at least one adsorbent bed containing an adsorbent material capable of selectively adsorbing nitrogen as the more readily adsorbable component of air, each bed undergoing, on a cyclic basis, a processing sequence consisting of the steps of:

(a) passing feed air to the feed end of the bed to increase the pressure of the bed from an intermediate pressure to a super-atmospheric adsorption pressure in the range of from about 100 kPa to about 160 kPa, with the selective adsorption of nitrogen from said feed air;

(b) passing additional quantities of feed air to the feed end of the bed at the super-atmospheric adsorption pressure, with the selective adsorption of nitrogen from said feed air and the simultaneous recovery of oxygen from the product end of the bed;

(c) countercurrent depressurization of the bed with the release of nitrogen from the feed end of the bed;

(d) evacuation of the bed to a lower sub-atmospheric desorption pressure with the withdrawal of nitrogen from the feed end of the bed, said lower sub-atmospheric desorption pressure being in the range of from about 20 kPa to about 70 kPa;

(e) introducing product oxygen to the product end of the bed at said lower sub-atmospheric desorption pressure as product purge gas to displace nitrogen from the product end of the bed, with the withdrawal of a nitrogen-containing waste stream from the feed end of the bed, such introduction of product purge gas being continued until shortly before breakthrough of high concentrations of oxygen into the waste stream; and (f) passing product oxygen to the product end of the bed to assure the displacement of nitrogen from the product end of the bed, and to increase the pressure in the bed from the lower sub-atmospheric desorption pressure to said intermediate pressure, whereby oxygen is recovered from air with low power consumption and enhanced overall efficiency.

2. The process of claim 1 in which the intermediate pressure is about 70% or less of the super-atmospheric adsorption pressure.

3. The process of claim 1 in which said product oxygen is recovered at a purity of from about 90% to about 95.6%.

4. The process of claim 1 in which the adsorbent material comprises lithium X, said super-atmospheric adsorption pressure being in the range of from about 110 kPa to about 160 kPa, and said lower sub-atmospheric desorption pressure being in the range of from about 30 kPa to about 50 kPa.

5. The process of claim 1 in which the adsorbent material comprises sodium X, said super-atmospheric adsorption pressure being in the range of from about 120 kPa to about 160 kPa, and said lower sub-atmospheric desorption pressure being in the range of from about 40 kPa to about 70 kPa.

6. The process of claim 1 in which the adsorbent material comprises calcium X, said super-atmospheric adsorption pressure being in the range of from about 100 kPa to about 120 kPa, and said lower sub-atmospheric desorption pressure being in the range of from about 20 kPa to about 35 kPa.

7. The process of claim 1 in which the adsorption system contains one adsorbent bed.

8. The process of claim 1 in which the adsorption system contains two adsorbent beds.

9. The process of claim 8 in which the countercurrent depressurization step is terminated in one bed at the same time that the passing of product oxygen to the product end of the other bed to increase the pressure therein to an intermediate pressure is terminated.

10. The process of claim 8 in which step (c) is terminated in one bed at the same time the step (e) is terminated in the other bed.

11. The process of claim 8 in which step (b) is terminated in one bed at the same time step (f) is terminated in the other bed.

12. The process of claim 8 in which step (b) is terminated in one bed at the same time the pressure in the other bed reaches one atmosphere in the other bed during step (a) therein.

13. The process of claim 1 in which the adsorption system contains three or more adsorbent beds.

14. The process of claim 13 in which the adsorption system contains three adsorbent beds, and the countercurrent depressurization step is terminated in one bed at the same time that the passing of product oxygen to the product end of another bed to increase the pressure therein to an intermediate pressure is terminated.

15. The process of claim 13 in which three adsorbent beds are included in the adsorption system and in which step (c) is terminated in one bed at the same time that step (e) is terminated in another bed of the system, the total time of steps (d) and (e) in each bed being about ⅓ of the overall processing sequence cycle time of steps (a)–(f) in each bed.

16. The process of claim 13 in which three adsorbent beds are included in the adsorption system and in which step (c) is terminated in one bed at the same time step (e) is terminated in the another bed, the total time of steps (a) and (b) in each bed being about ⅓ of the overall processing sequence cycle time of steps (a)–(f) in each bed.

17. The process of claim 13 in which three adsorbent beds are included in the adsorption system and in which step (b) is terminated in one bed at the same time the pressure in the other bed reaches one atmosphere during step (a) therein, the total time of steps (a) and (b) in each bed being about ⅓ of the overall processing sequence cycle time of steps (a)–(f) in each bed.

18. The process of claim 13 in which three adsorbent beds are included in the adsorption system and in which step (b) is terminated in one bed at the same time step (e) is terminated in the other bed, the total time of steps (b) and the superatmospheric portion of step (a) being about ⅓ of the total cycle time.

19. The process of claim 13 in which three adsorbent beds are included in the adsorption system and in which step (b) is terminated in one bed at the same time the pressure in the other bed reaches one atmosphere during step (a) therein, the total time of step (b) and the superatmospheric portion of step (a) being about ⅓ of the total cycle time.

* * * * *